United States Patent [19]

Yamada et al.

[11] Patent Number: 5,288,357
[45] Date of Patent: Feb. 22, 1994

[54] METHOD FOR MANUFACTURING PREPREG LAMINATIONS

[75] Inventors: Hideyuki Yamada, Shida; Masafumi Tsunada; Yasuhiko Nagakura, both of Numazu; Soichi Shin, Tagata, all of Japan

[73] Assignee: Toshiba Kikai Kabushiki Kaisha, Tokyo, Japan

[21] Appl. No.: 865,025

[22] Filed: Apr. 7, 1992

[30] Foreign Application Priority Data

Apr. 8, 1991 [JP] Japan .................. 3-075196

[51] Int. Cl.⁵ .................. B32B 31/20; B32B 31/10
[52] U.S. Cl. .................. 156/249; 156/299; 156/321; 156/322; 156/499
[58] Field of Search .............. 156/499, 523, 574, 359, 156/425, 166, 441, 296, 321, 322, 249, 299; 392/307, 314, 418; 219/148, 443, 455; 165/918

[56] References Cited

U.S. PATENT DOCUMENTS

| | | | |
|---|---|---|---|
| 2,750,320 | 6/1956 | Latham | 156/275.5 |
| 3,115,731 | 12/1963 | Blythe et al. | 156/359 X |
| 3,389,535 | 6/1968 | Armetti | 392/418 X |
| 4,208,238 | 6/1980 | August et al. | 156/523 X |
| 4,333,003 | 6/1982 | Rivera | 392/418 X |
| 4,714,509 | 12/1987 | Gruber | 156/309.9 X |
| 5,080,851 | 1/1992 | Flonc et al. | 156/228 X |
| 5,228,944 | 7/1993 | Seifreid et al. | 156/322 X |

OTHER PUBLICATIONS

Ernest, W., et al "RU Reinforcing Plastics With Robots?", Plastics Engineering, May 1981, pp. 37–46.

*Primary Examiner*—Jeff H. Aftergut
*Attorney, Agent, or Firm*—Cushman, Darby & Cushman

[57] ABSTRACT

In a method and apparatus for laminating prepreg sheets, a plurality of heaters and a plurality of fans are installed beneath an operating table and a table temperature sensor and a room temperature sensor are provided in and above the operating table respectively. The heaters, fans, table temperature sensor and the room temperature sensor are controlled by a temperature control device. A face sheet is mounted on the operating table and the prepreg sheets are laminated while maintaining the temperature of the face sheet at a higher value than the temperature of the prepreg sheets, whereby the adhesive force of the face sheet becomes higher than that of a carrier sheet so that the prepreg sheet can be accurately bonded to the face sheet.

4 Claims, 3 Drawing Sheets

TEMPERATURE DIFFERENCE BETWEEN OPERATING TABLE AND ROOM ( Tt - Tr )

METHOD FOR MANUFACTURING PREPREG LAMINATIONS

BACKGROUND OF THE INVENTION

This invention relates to a method and apparatus for manufacturing a prepreg lamination by laminating prepregs. More particularly, a method and apparatus for laminating a prepreg of the first layer of the lamination on the surface.

Composite materials have been abundantly used for manufacturing parts of aircrafts, parts of mechanical structural members, and sports and leisure articles. As the composite material, is generally used a prepreg lamination which is prepared by impregnating epoxy resin or the like into such reinforcing fibers as glass fibers, carbon fibers, boron fibers or the like to form a prepreg sheet, laminating the prepreg sheets into a prepreg laminated sheet and cutting the prepreg laminated sheet to have a configuration suitable for the products. After subjecting the prepreg laminated sheet to bonding or the like working the prepreg laminated sheet is applied with pressure and heat in vacuum or reduced pressure atmosphere to obtain an article made of composite material. The lamination methods are classified into one in which the lamination is made by a manual operation and the other in which the lamination is made by an automatic machine. However in both methods the lamination methods are substantially the same.

The method of lamination by manual operation will be described with reference to FIGS. 5(a) through 5(f). Usually one side of a prepreg sheet 1 is bonded with a carrier sheet 2 impregnated with a silicone resin, and a prepreg tape 3 made up of the carrier sheet 2 and the prepreg sheet 1 is wound about a core pipe 4a (see FIG. 5(a)) to form a prepreg roll 4. Then a prepreg tape 3 is payed out from the prepreg roll 4 and cut to have a predetermined dimension and configuration. Then the carrier sheet 2 is peeled off from the prepreg tape 3 (see FIG. 5(c)) and the prepreg sheet 1 from which the carrier sheet 2 has been removed is bonded with a face sheet 5 used as a substratum for lamination, made of a plastic sheet and to be peeled off later. Then on the prepreg sheet 1, a predetermined number of prepreg sheets are laminated with their orientations of fibers changed, for example 45°, 90° (see FIG. 5(d)) for laminating prepreg sheets on the face sheet 5. Then only the prepreg laminated sheet is cut to have a predetermined configuration without cutting the face sheet 5. Then the face sheet 5 is peeled off from the prepreg laminated sheet to form a prepreg laminated member 6 (see FIG. 5(e)). Then the prepreg laminated member 6 is bent and applied with pressure and heat in vacuum or in a reduced pressure atmosphere to form a molded member 7 as shown in FIG. 5(f).

Since in the first layer obtained by bonding the prepreg sheet 1 to the face sheet 5, by taking into consideration the fact that the face sheet 5 is peeled off in the subsequent step, a plastic sheet easy to peel off is used, and as the adhesive force is low, there is a tendency of entrapping air bubbles 8 between the prepreg sheet and the plastic sheet when the prepreg sheets are laminated under these conditions, undesirable phenomena of the first layer of the prepreg sheet 1 affect the subsequent lamination operation, thereby decreasing the quality of the prepreg laminated member 6. As a consequence, where these defects are corrected by a manual operation, the surface of the prepreg sheet is pressed by hands or a roller for purging out the air bubbles from the prepreg sheets 1 while observing the operation with the eyes of the operator for removing wrinkles. Since these operations are repeated, large labour and time are necessary. Where the face sheet 5 and the prepreg sheet are laminated by an automatic machine, the most adequate values are utilized by varying the pressure of the prepreg tape 3 applied to the face sheet and the tension and laminating speed of the prepreg tape 3. These methods also accompany the phenomena of air bubbles, wrinkles and peel off. Unless the first layer is perfectly corrected, subsequent laminating operations are affected so that the correction by manual operations are essential, thereby greatly decreasing the operating efficiency.

SUMMARY OF THE INVENTION

It is, therefore, an object of this invention to provide a novel method and apparatus for manufacturing prepreg laminations capable of preventing air bubbles and wrinkles when the prepreg sheet is bonded to a face sheet.

Another object of this invention is to provide a novel method and apparatus for manufacturing prepreg laminations capable of simplifying the construction and reducing the manufacturing cost of the prepreg lamination manufacturing apparatus by providing heating means and hot air circulating means for an operating table.

According to one aspect of this invention, there is provided a method of laminating prepreg sheets comprising the steps of laminating prepreg sheets on a face sheet mounted on an operating table while peeling off a carrier sheet of a prepreg tape, and elevating the temperature of the face sheet.

According to another aspect of this invention there is provided apparatus for laminating prepreg sheets comprising an operating table, means for laminating prepreg sheets on a face sheet mounted on the operating table while peeling off a carrier sheet of a prepreg tape, heating means for heating the face sheet, and means for circulating hot air generated by the heating means for uniformly transmitting heat generated by the heating means to the face sheet.

DESCRIPTION OF THE PREFERRED EMBODIMENT

Figure 1:
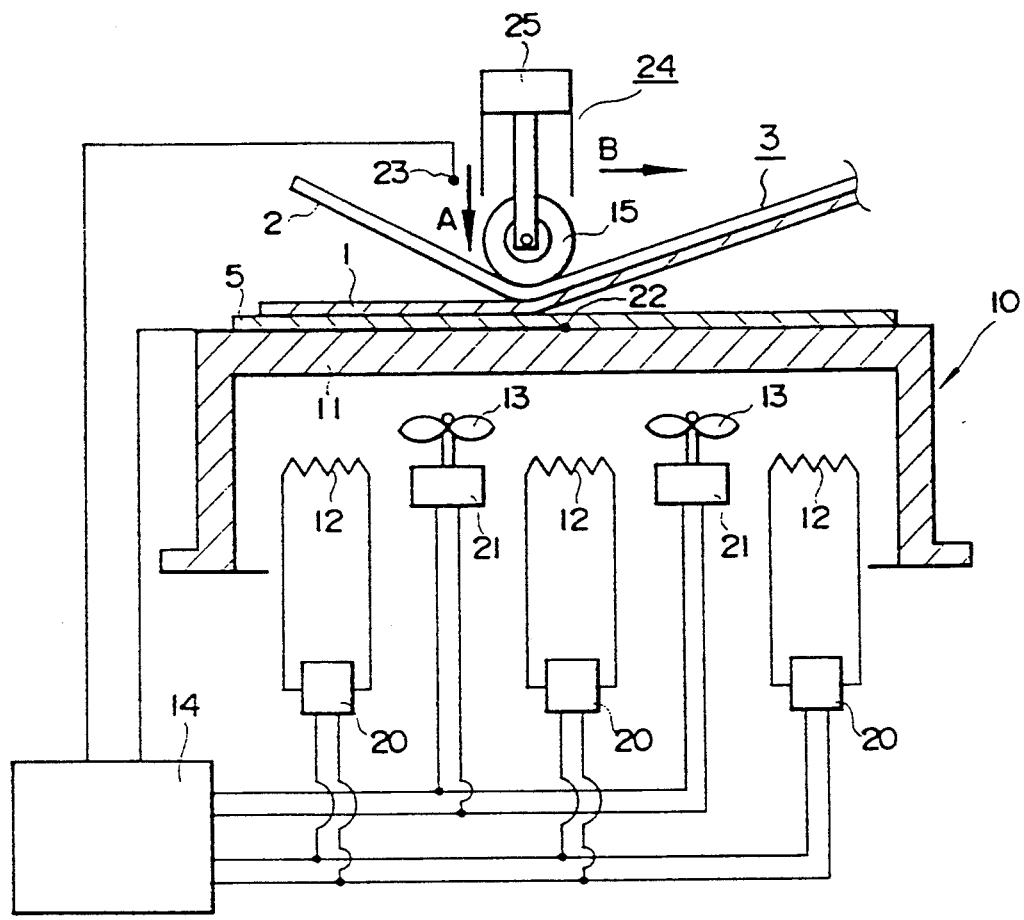
FIG. 1 is a vertical sectional view, partly in block, showing a preferred embodiment of the prepreg laminating apparatus according to this invention.
Figure 2:
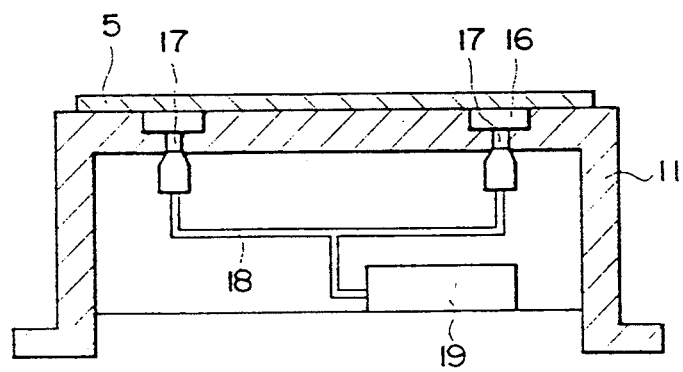
FIG. 2 is a longitudinal sectional view showing the operating table of the prepreg laminating apparatus.
Figure 3:
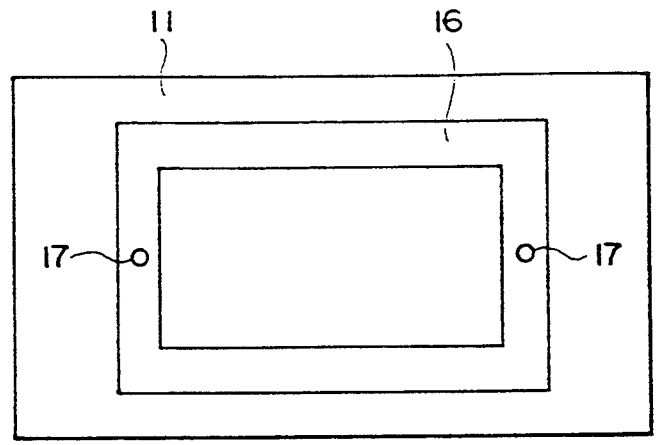
FIG. 3 is a plan view showing the operating table shown in FIG. 2.

A preferred embodiment of this invention will be described with reference to FIGS. 1-4 of the accompanying drawings in which parts identical to those shown in FIGS. 5(a)-(f) showing a prior art method have identical reference numbers.

A prepreg laminating apparatus 10 comprises an operating table 11, electric heaters 12 located beneath the operating table for heating a face sheet 5 mounted on the operating table, air circulating fans 13 for uniformly transmitting the heat of heaters to the face sheet 5 on the operating table 11, and a temperature control device 14 for adjusting the quantity of heat generated by heaters 12 and the air quantity circulated by fans 13 to maintain the temperature of the face sheet at a constant value. A laminating roller 15 for laminating prepreg sheets 1 is located on the face sheet 5 above the operating table 11.

The operating table 11 is provided with a rigid flat horizontal surface not to distort when subjected to a pressure necessary for lamination. Preferably, a rectangular recess 16 having a predetermined width and depth is formed on the upper surface of the operating table along the outer periphery thereof for fixing the face sheet 5 on the table 11. Suction ports 17 are formed at the bottom surface of the recess. The suction ports 17 are connected to a vacuum pump 19 through pipes 18 for sucking air in the recess 16. The face sheet 5 is mounted on the surface of the operating table 11 having the recess 16. With this construction, as the face sheet 5 snugly fits on the upper surface of the operating table 11, the heat generated by heaters 12 are efficiently transmitted to the face sheet 5 so as to make substantially equal the temperature of the operating table 11 and the temperature of the face sheet 5.

A plurality of heaters 12 (three in FIG. 1) are installed beneath the operating table 11. Fans 13 are connected to a temperature control device 14 through control switches 21.

A temperature sensor 22 for detecting the temperature of the operating table 11 is embedded in the upper surface of the operating table 11 and is connected to the temperature control device 14 together with a room temperature sensor 23.

A laminating roller 15 disposed above the operating table 11 is made of elastic or solid rubber and moved in the vertical direction, shown by an arrow A in FIG. 1, by a pneumatic cylinder 25 of a mechanism 24 for applying pressure to the lamination. The device with the pressure applying mechanism 24 is moved in the horizontal direction (shown by an arrow B in FIG. 1) by running means, not shown.

The prepreg laminating apparatus described above operates as follows.

First, the vacuum pump 19 is operated to suck the face sheet 5 against the operating table. Then the temperature control device 14 is set such that the operating temperature of the table temperature sensor 22 would be higher than that of the room temperature sensor 23 by about 2°-5° C. (for example 3° C.). As the heaters 12 and fans 13 are started, the operating table 11 is uniformly heated with the result that the face sheet 5 on the operating table 11 is also uniformly heated. The temperature of the face sheet 5 is always maintained at a temperature higher than the room temperature by the temperature control device 14. Then a prepreg tape 3 including the carrier sheet 2 are payed out from a roll, not shown, with the upper surface of the face sheet 5 directed upward. Then by the action of the laminating roller 15 the prepreg tape 3 is urged against the prepreg sheet 1 so as to adhere the prepreg sheet 1 to the face sheet 5. Then the carrier sheet 2 is peeled off from prepreg sheet 1 and taken up by a roller not shown. Then the temperature of prepreg sheet 1 on the side of the face sheet 5 approaches that of the face sheet 5 so that there occurs a temperature difference between the upper and lower surfaces. Since the adhesive force of the prepreg sheet 1 increases as a result of temperature rise, the prepreg sheet 1 is caused to positively adhere to the face sheet 5 by the pressure applied by the laminating roller 15. Consequently air bubbles 8 are squeezed out and no wrinkle 9 is formed. Furthermore, the temperature of the prepreg sheet 1 on the side of the carrier sheet 2 is lower than that of the prepreg sheet 1 on the side of the face sheet 5, the adhesive force is smaller than that between the prepreg sheet 1 and the face sheet 5. As a consequence, the carrier sheet 2 can be smoothly peeled off from the prepreg tape 3 without peeling off the prepreg sheet 1 from the face sheet 5. The second and succeeding layers are sequently laminated by a conventional method of lamination.

Figure 4:
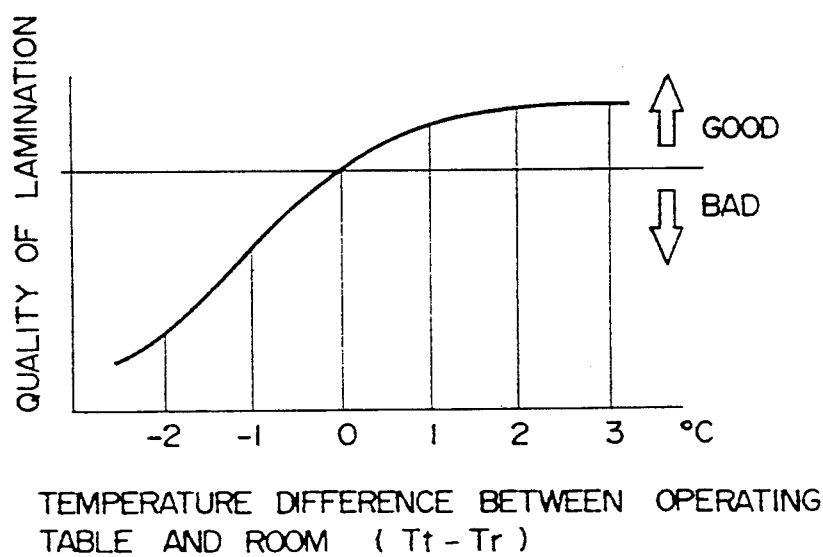
FIG. 4 is a graph showing the relation between the temperature difference between the operating table and an operating room, and the quality of a product.
Figure 5A:
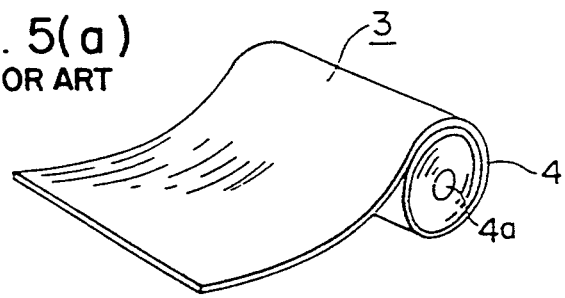
FIGS. 5(a)-5(f) are perspective views showing various steps of the prior art laminating method of prepregs.
Figure 5B:
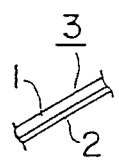
Figure 5C:
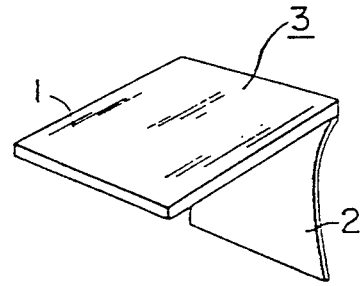
Figure 5D:
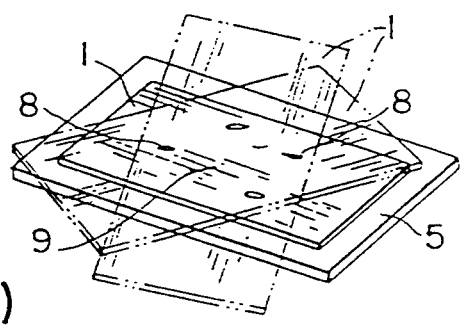
Figure 5E:
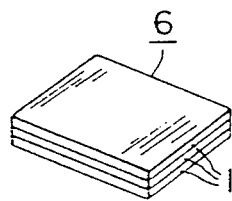
Figure 5F:
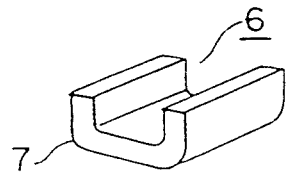

FIG. 4 is a graph showing the result of experiment representing the relation between the temperatures of table 11 and room and the quality of a lamination of the prepreg sheet 1 (presence or absence of air bubbles, peel off state, etc.). This graph shows that where the temperature (Tt) of the operating table 11 is higher than the room temperature (Tr), the quality of the prepreg laminated sheet is excellent. No air bubbles and high quality. More particularly when the temperature of the face sheet 5 is made high, preferably by 2°-5° C., for increasing the adhesion strength between the prepreg sheet 1 and the face sheet 5 above that between the prepreg sheet 1 and carrier sheet 2, even when the carrier sheet 2 is peeled off from the prepreg tape 3, the prepreg sheet 1 would not peel off from the face sheet 5 so that no air bubble and wrinkle would be formed.

Although in this embodiment, the operating table supporting the lamination materials is heated, the materials can be heated. Furthermore, when the room temperature is high (for example, higher than 25° C.), the prepreg sheet can be cooled to about 20°-25° C.

As above described, according to the method of laminating prepreg sheets of this invention, as the temperature of the face sheet is made to be higher than that of the prepreg sheet, so that the prepreg sheet has a higher adhesive power, that is bonding power than the carrier sheet of the prepreg sheet so that the prepreg sheets can be accurately laminated without forming air bubbles and wrinkles. Furthermore, according to the apparatus for laminating prepreg sheets, by merely providing heating means and hot air circulating means for the operating table excellent prepreg laminated sheets without air bubbles and wrinkles can be obtained. As a consequence, the objects of this invention can be attained with a simple and low cost apparatus.

In the above described embodiment, the vacuum pump 19 is used to suck the face sheet 5 against the operating table 11 firmly, but the vacuum pump 19 is not always necessary to achieve the above described effects of this invention.

What is claimed is:

1. A method for laminating plural layers of a prepreg sheet on a face sheet mounted on an operating table comprising the steps of:

mounting said face sheet on a first surface of said operating table having said first surface and a second surface opposite said first surface;

uniformly heating said second surface of said operating table to a desired temperature above room temperature of a room in which operating table is disposed to allow heat to be conducted through said operating table from said second surface to said first surface to enable said first surface of said operating table to heat uniformly to a temperature said face sheet contacting said first surface;

placing a prepreg tape, comprising a carrier sheet and said prepreg sheet, on said face sheet already uniformly heated during the heating step to allow said face sheet to heat said prepreg sheet, said prepreg sheet being placed adjacent to said face sheet;

controlling said temperature to which said second surface of said operating table is heated to maintain said temperature of said face sheet higher than a temperature of said prepreg sheet and said carrier sheet; and laminating said prepreg sheet onto said face sheet by urging said prepreg sheet against said face sheet while peeling said carrier sheet off of said prepreg sheet, said laminating step occurring while said second surface of said operating table is at said desired temperature and said controlling step is causing said temperature of said face sheet to be higher than said temperature of said prepreg sheet and said carrier sheet.

2. The method according to claim 1, further comprising the step of controlling said temperature of said operating table to maintain said temperature of said face sheet at a constant value.

3. The method claim according to claim 1, wherein said heating step includes the step of heating said operating table so that the temperature of said operating table is maintained 2° to 5° C. higher than the room temperature.

4. The method according to claim 1, wherein said heating step further comprises the steps of:

heating an atmosphere in which said second surface of said operating table is disposed; and circulating said atmosphere heated by said atmosphere heating step to convectively uniformly heat said second surface of said operating table.

* * * * *